(12) United States Patent
Bester

(10) Patent No.: US 12,348,013 B2
(45) Date of Patent: Jul. 1, 2025

(54) APPARATUS FOR ATTACHING RESTRAINING MEANS TO A LINE

(71) Applicant: Francois Retief Bester, Tweeling (ZA)

(72) Inventor: Francois Retief Bester, Tweeling (ZA)

( * ) Notice: Subject to any disclaimer, the term of this patent is extended or adjusted under 35 U.S.C. 154(b) by 876 days.

(21) Appl. No.: 17/617,202

(22) PCT Filed: Jun. 8, 2020

(86) PCT No.: PCT/ZA2020/050029
§ 371 (c)(1),
(2) Date: Dec. 7, 2021

(87) PCT Pub. No.: WO2020/247988
PCT Pub. Date: Dec. 10, 2020

(65) Prior Publication Data
US 2022/0247160 A1    Aug. 4, 2022

(30) Foreign Application Priority Data

Jun. 7, 2019 (ZA) .................................. 2019/03643
Jun. 7, 2019 (ZA) .................................. 2019/03644

(51) Int. Cl.
*H02G 1/02* (2006.01)
*H02G 7/18* (2006.01)

(52) U.S. Cl.
CPC .................. *H02G 1/02* (2013.01); *H02G 7/18* (2013.01)

(58) Field of Classification Search
CPC .................................... H02G 1/02; H02G 7/18
See application file for complete search history.

(56) References Cited

U.S. PATENT DOCUMENTS 5,010,630 A * 4/1991 Mickelson ........... A44C 5/2052
24/647

FOREIGN PATENT DOCUMENTS

CN        206293822 U  *  6/2017
JP          06225420 A  *  8/1994
KR     20160139738 A  * 12/2016

* cited by examiner

*Primary Examiner* — Stephen A Vu
(74) *Attorney, Agent, or Firm* — Amster, Rothstein & Ebenstein LLP

(57) ABSTRACT

This invention relates to an apparatus (1) for attaching restraining means (10, 11) to a line (3) and more specifically, but not exclusively, to an apparatus (1) for attaching a safety net to a powerline. Replacement of transmission lines (3) is a laborious process and can be very dangerous, especially when overhead lines (3), or earth wires located above live lines (3), must be replaced. There is a real risk that if the overhead line (3) fails it may fall onto the live lines (3) below and cause damage to expensive infrastructure and injury or death. The invention provides an apparatus (1) for attaching restraining means (10, 11) to a line (3) comprising two or more members movable relative to each other between an open position wherein a line (3) is engageable by the apparatus (1) and a closed position wherein a line (3) is engaged by the members. At least one of the members including restraint attachment means for attaching a restraint (10, 11) to the apparatus (1).

15 Claims, 12 Drawing Sheets

APPARATUS FOR ATTACHING RESTRAINING MEANS TO A LINE

CROSS-REFERENCE TO RELATED APPLICATIONS

This application is a U.S. national stage entry under 35 U.S.C. § 371 of PCT International Patent Application No. PCT/ZA2020/050029, filed Jun. 8, 2020, which claims priority to South African Patent Application No. 2019/03643, filed Jun. 7, 2019 and South African Patent Application No. 2019/03644, filed Jun. 7, 2019, the contents of which are incorporated herein by reference in their entirety.

FIELD OF THE INVENTION

This invention relates to an apparatus for attaching restraining means to a line and more specifically, but not exclusively, to an apparatus for attaching a safety net to a powerline.

BACKGROUND TO THE INVENTION

Replacement of transmission lines is a laborious process and can be very dangerous, especially when overhead lines, or earth wires located above live lines, must be replaced. Where the overhead lines are replaced, there is a real risk that if the overhead line, or related replacement equipment fails, it may fall onto the live lines below and cause damage to expensive infrastructure and injury or death.

OBJECT OF THE INVENTION

It is accordingly an object of this invention to provide an apparatus for attaching restraining means to a line which, at least partially, alleviates the problems associated with the prior art or provides a useful alternative thereto.

SUMMARY OF THE INVENTION

In accordance with the invention there is provided an apparatus for attaching restraining means to a line comprising:
  two or more members movable relative to each other between an open position wherein a line is engageable by the apparatus and a closed position wherein a line is engaged by the members;
  at least one of the members including restraint attachment means for attaching a restraint to the apparatus.

The members move relative to each other by pivoting about a hinge located at one end of the members such that other ends of the members pivot away from each other toward the open position and to each other towards the closed position.

The members may include locking means for locking the apparatus in the closed position. The locking means may be a locking formation, wherein the locking formation of one member engages the locking formation of the other member. The locking means may include a removable pin, wherein the removable pin locks the members together. The pin may also be used as a pivot of the hinge, such that the members move relative to each other about the pins.

The members may be identical in shape and size. The identical members may engage each other inverted.

The members may include an engaging formation on one end and a complementary engaging formation on an opposing end such that the engaging formation on one end of the member can engage a complementary engaging formation on another member.

The apparatus may include three members wherein, in the closed position, the engaging formation of the first member engages the complementary engaging formation of the second member, the engaging formation of the second member engages the complementary engaging formation of the third member, and the engaging formation of the third member engages the complementary engaging formation of the first member, such that the three members form a triangular shape and the second and third members move outwardly away from each other toward the open position.

The engaging formations and complementary engaging formations are held together by a removable pin which allows members to move relative to each other by pivoting about the pins in the open position when two of the three pins are installed and locks the apparatus in the closed position when the third pin is installed.

Each member may include an engaging member for engaging a line. The engaging member may be a roller which enables the apparatus to move along the line.

Rollers may have concave profiles which forms an aperture between them which is substantially circular and corresponds roughly to the shape and size of the line in the closed position.

The members may form a groove for positioning a recovery line or rope in the closed position. The groove may be located operatively lower than the aperture such that a line engaged in the aperture will prevent the recovery line from exiting the groove. The groove may be formed between members and engage the recovery line between the members.

Each member may have attachment means located operatively at a corner thereof. The attachment means may include locking means for securing at least part of the restraining means to the member.

The members may each include a partial attachment formation at an operatively lower end thereof, whereby the partial attachment formations form a complete central attachment formation in the closed position.

The attachment means of the members are arranged in a triangular formation when the apparatus is in the closed position.

The restraining means may be an elongate net with two outer portions and central portion running longitudinally along the net. The portions may be ropes, whereby the outer ropes are attached to the corner attachment means of the apparatus and the central rope is attached to the central attachment formation to maintain the profile of the net in a concave shape below the line. The concave shape may be triangular.

In accordance with a second aspect of the invention there is provided a method of attaching restraining means to a line comprising the steps of:
  providing elongate restraining means;
  providing a plurality of apparatuses for attaching restraining means to a line;
  attaching the restraining means to the apparatuses at regular intervals;
  engaging each of the apparatuses to the line and moving each apparatus along the line such that the restraining means is attached to the line along the length thereof.

The method may include the step of attaching the apparatuses to the restraining means through attachment means on the apparatuses.

The step of attaching the apparatuses to the line may be performed by a first person on the ground. The step of engaging the line may be performed by a second person on a tower holding the line.

The method may include the step of adding a recovery line to the apparatuses.

The apparatuses are movable between open and closed positions such that the apparatus is engageable to the line when in the open position and engages the line in the closed position. The second person may move the apparatuses between the open and closed positions to engage the line.

The method may include the step of moving the apparatuses between a first tower and a second tower.

The method may include the step of attaching the restraining means to each tower such that the restraining means is secured operatively below and around the line. The restraining means will submerge line within itself and will have restraining at the top of the net as well, to prevent the line from coming out the top.

The method includes the steps of cutting the existing line and splicing the end of a replacement line to the cut end of the existing line. The method includes the step of using the existing line draw the replacement line through the apparatuses towards the second tower. The method may include the step of installing a pilot or fish line.

BRIEF DESCRIPTION OF THE DRAWINGS

An embodiment of the invention is described below, by way of example only, and with reference to the drawings in which.

DETAILED DESCRIPTION OF THE DRAWINGS

Figure 1:
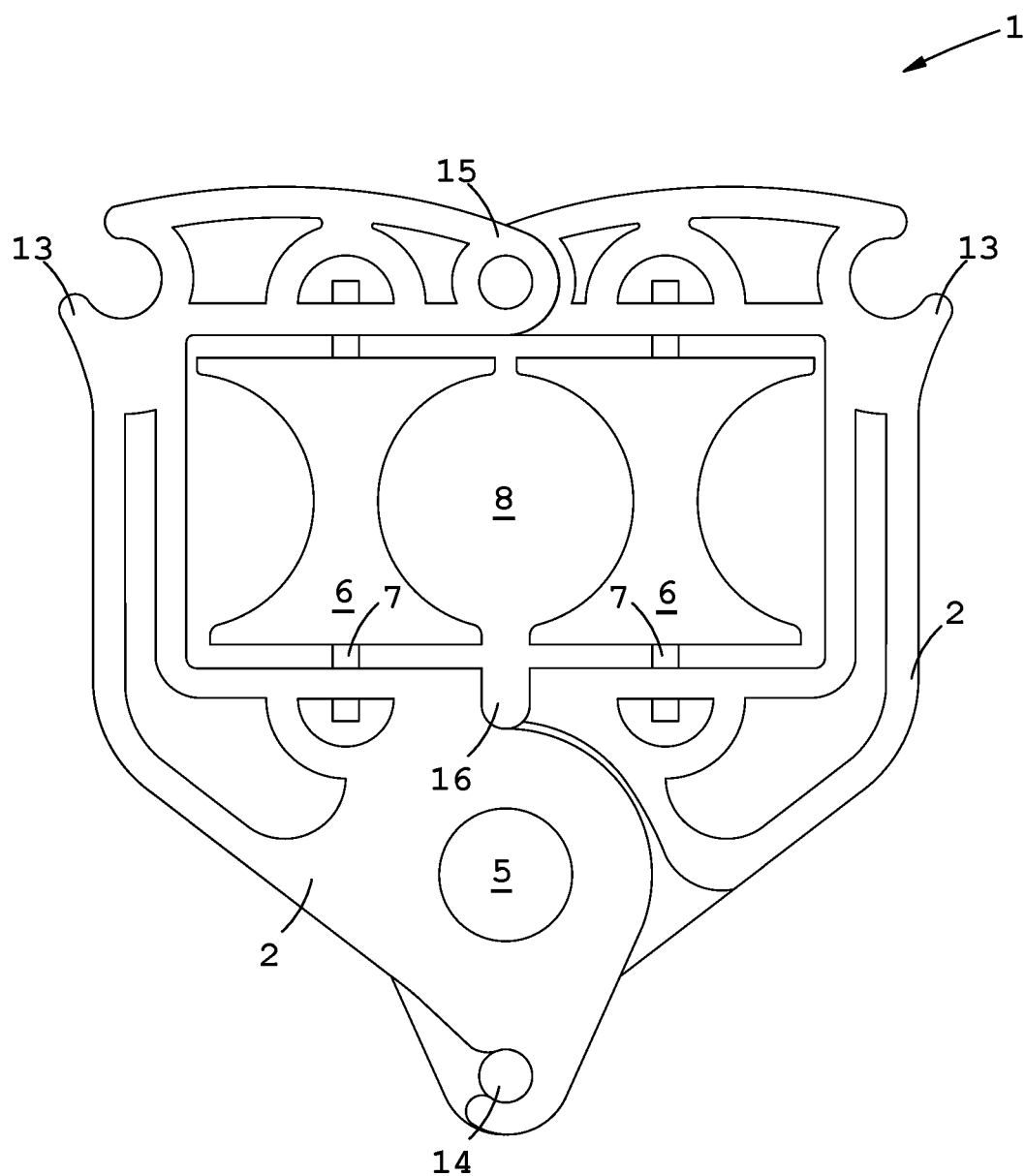
FIG. 1 is a plan view of a first embodiment of an apparatus for attaching restraining means to a line in a closed position.

With reference to the drawings in which like features are indicated by like numerals, an apparatus for attaching restraining means to a line is generally indicated by reference numeral 1.

Figure 2:
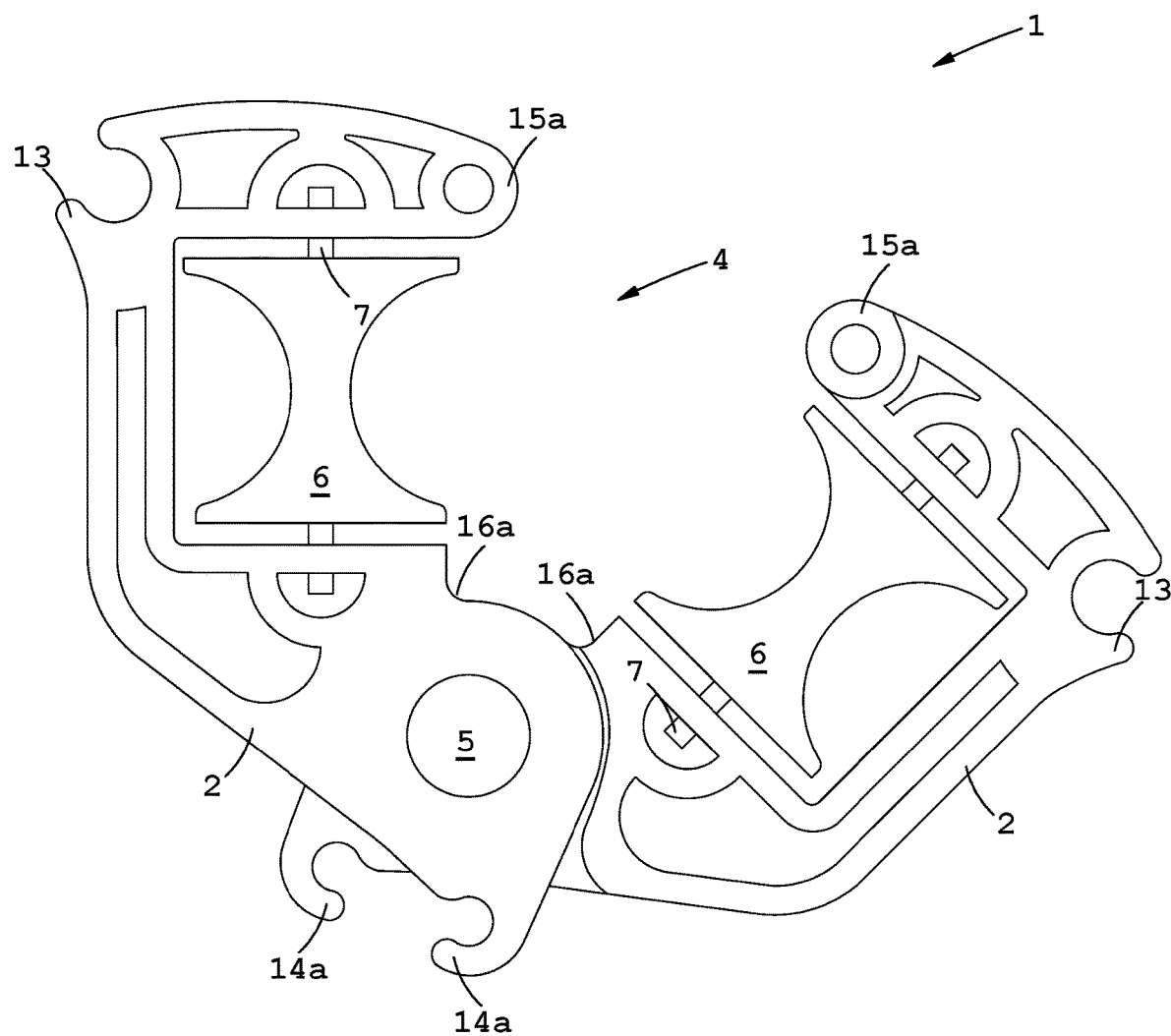
FIG. 2 is a plan view of a first embodiment of an apparatus for attaching restraining means to a line in an open position.
Figure 3:
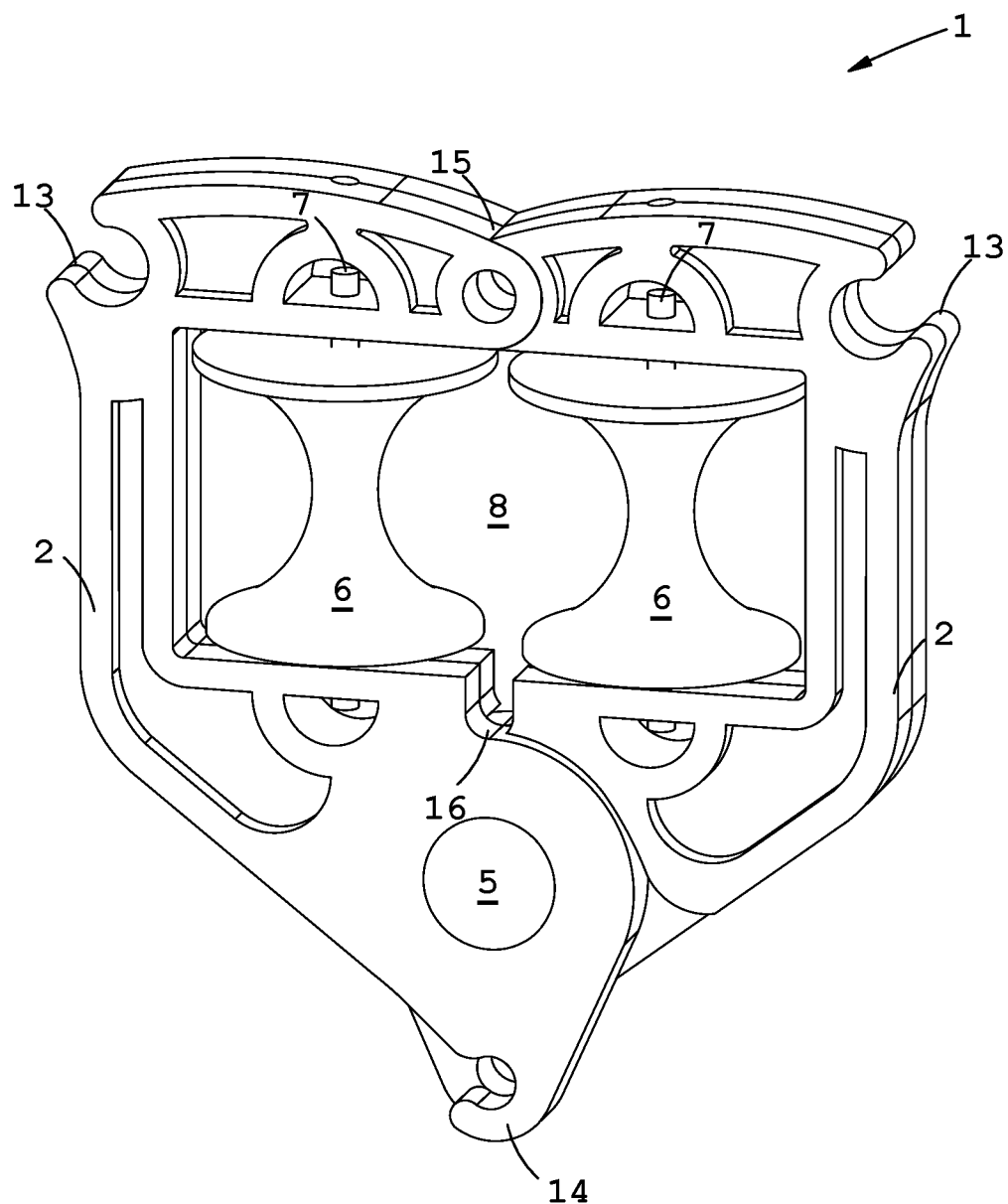
FIG. 3 is a perspective view of the apparatus of FIG. 1.
Figure 4:
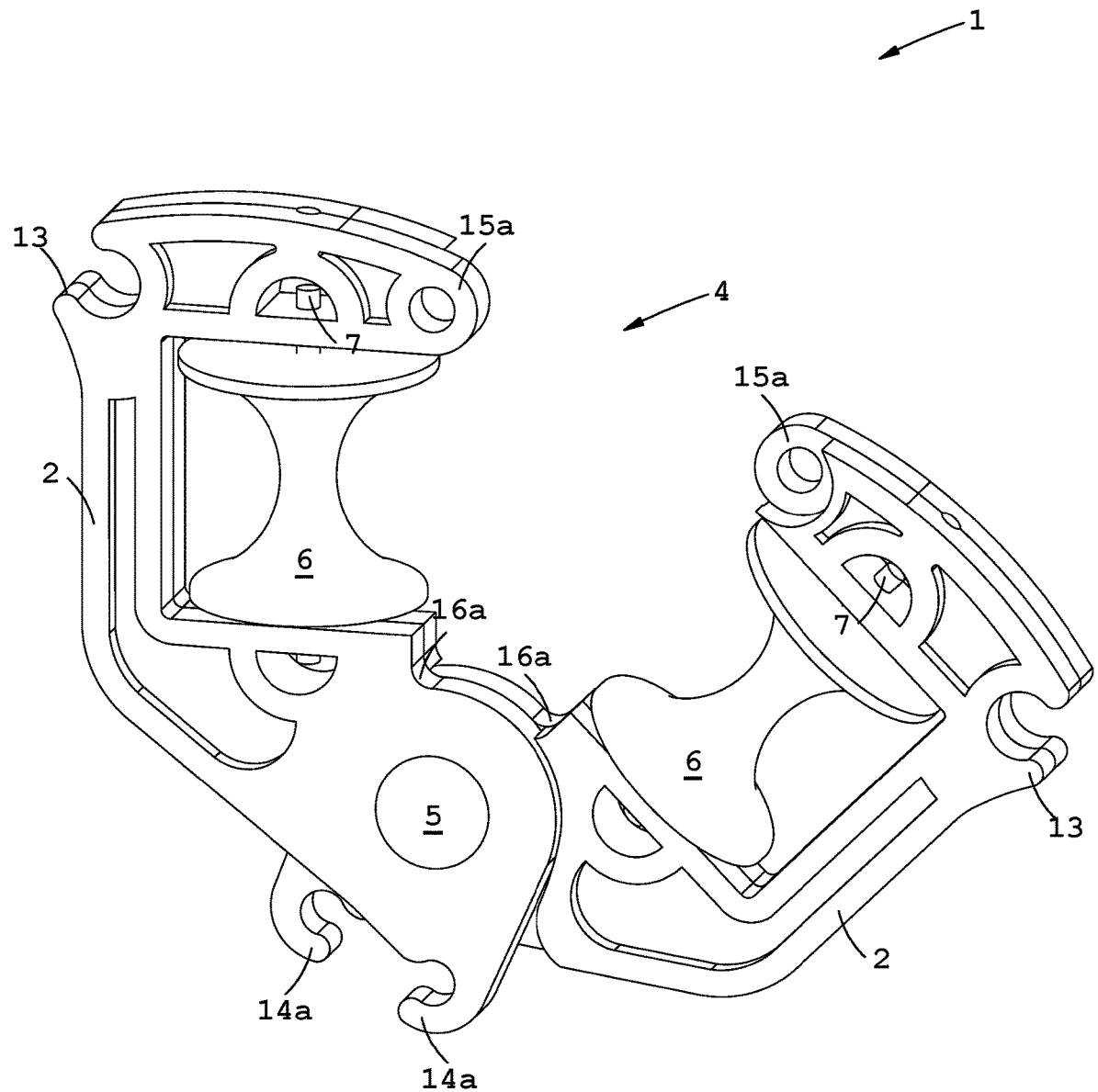
FIG. 4 is a perspective view of the apparatus of FIG. 2.
Figure 5:
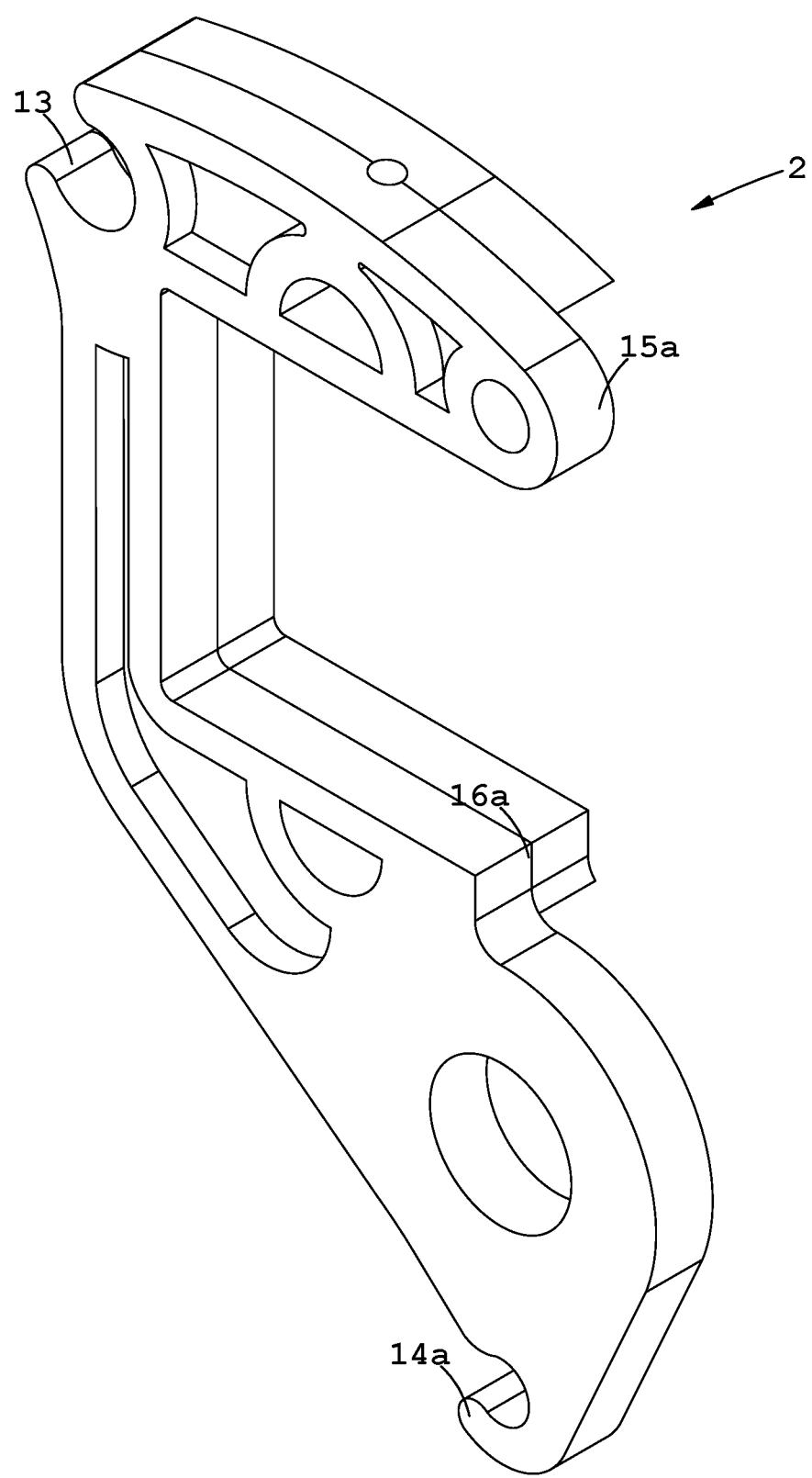
FIG. 5 is a perspective view of a first embodiment of a member from a first angle.
Figure 6:
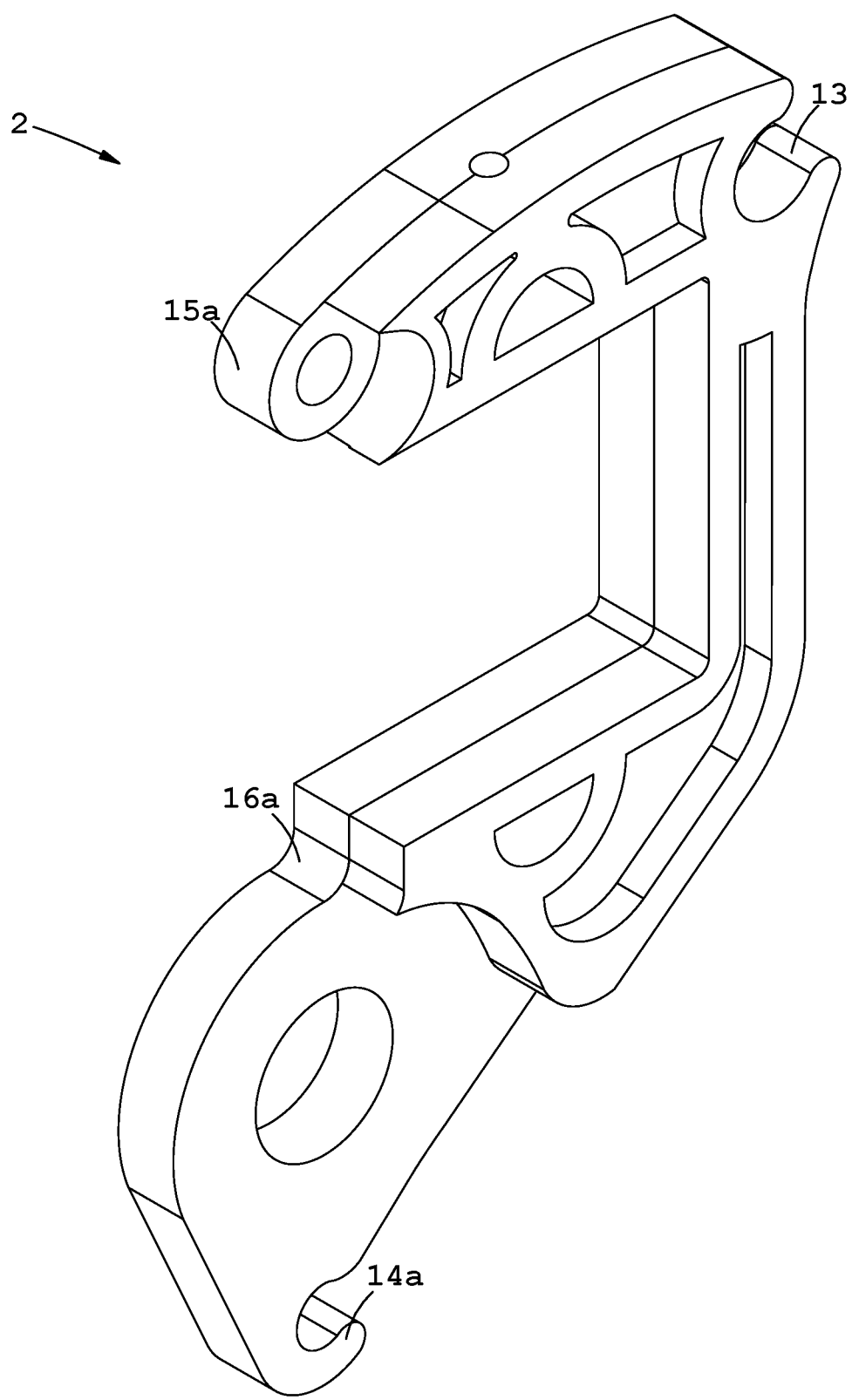
FIG. 6 is a perspective view of the member of FIG. 5 from a second angle.
Figure 7:
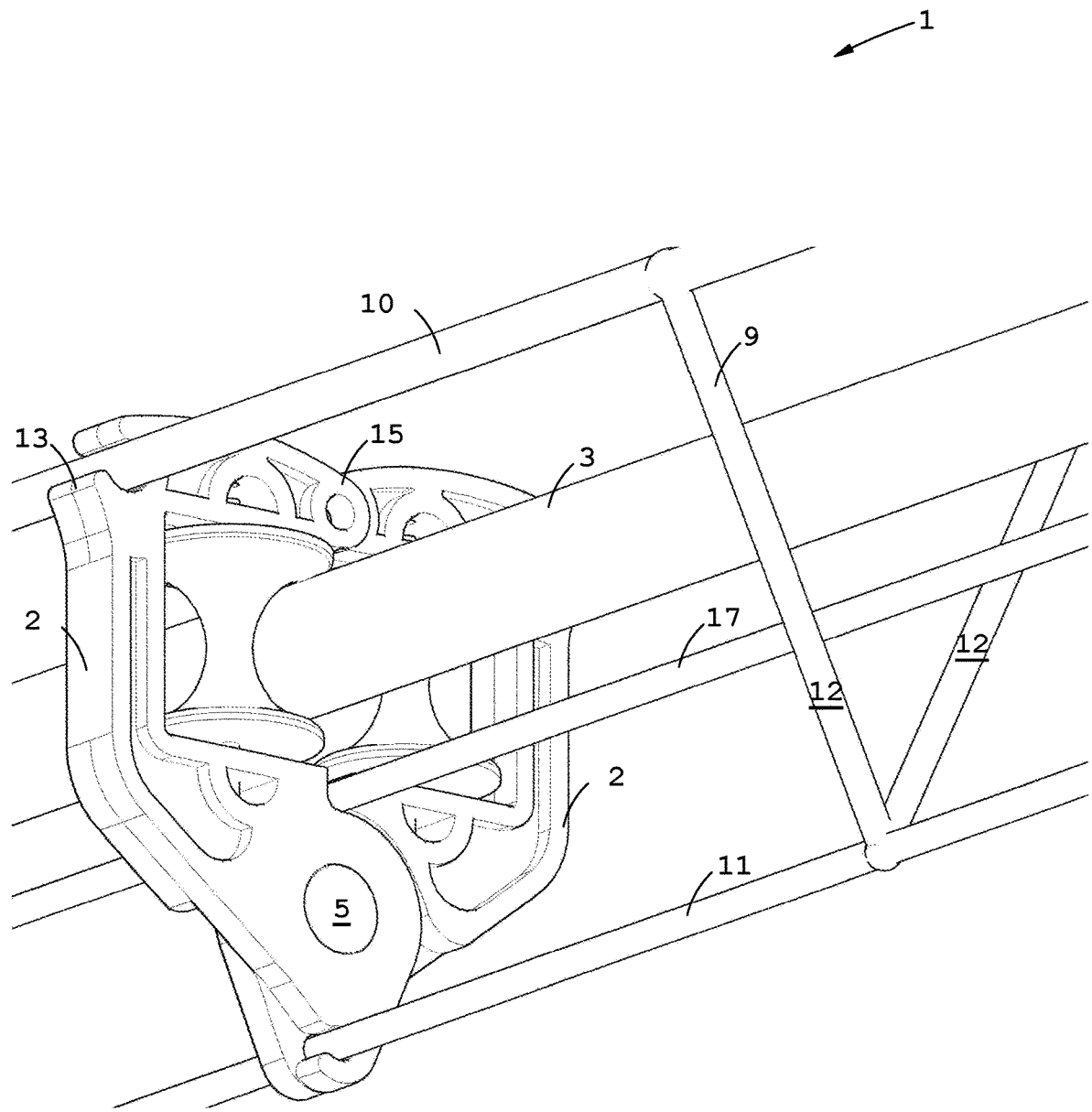
FIG. 7 is a perspective view of a first embodiment of an apparatus for attaching restraining means to a line in a closed position in use.
Figure 8:
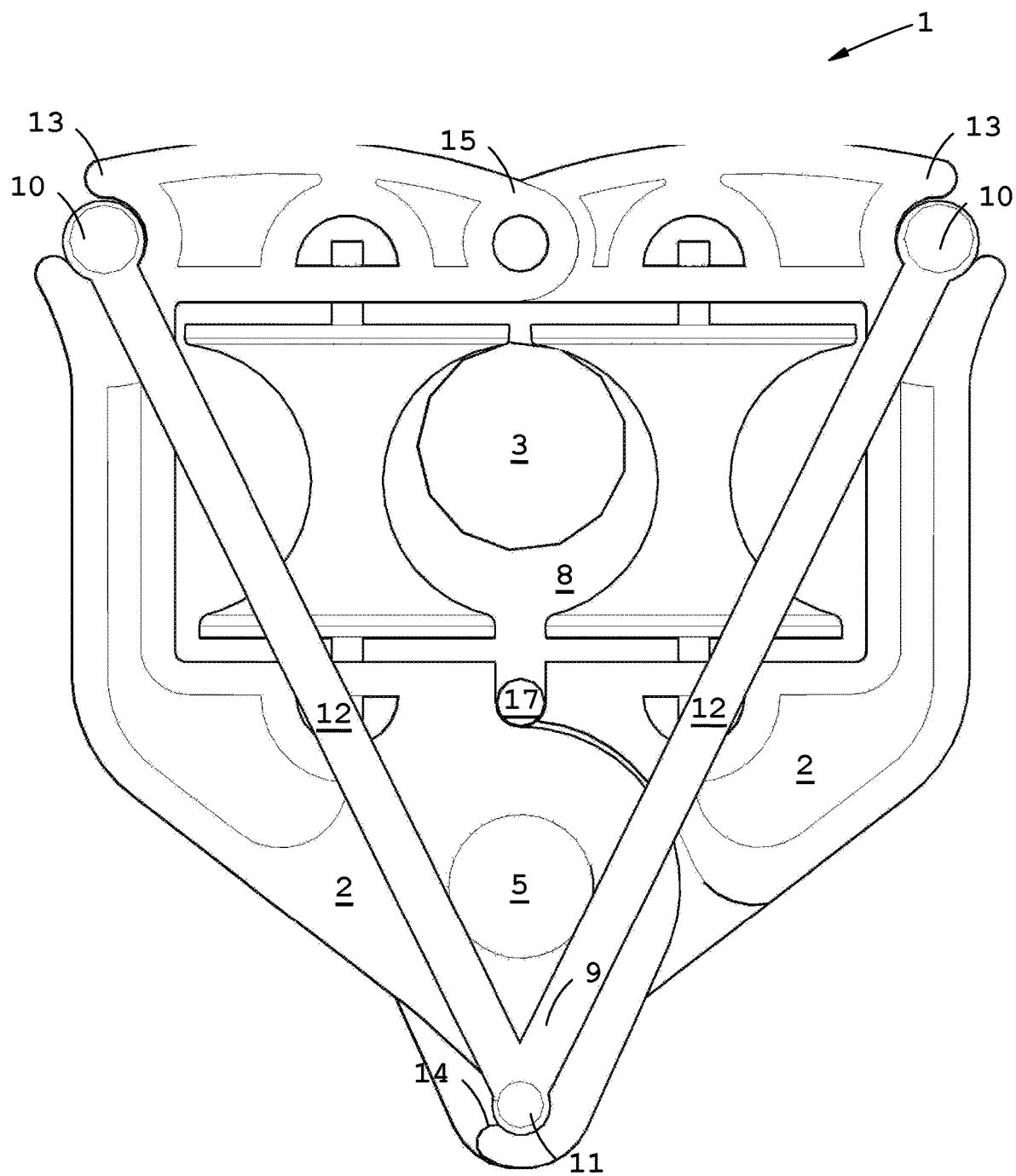
FIG. 8 is a plan view of the apparatus of FIG. 7.
Figure 9:
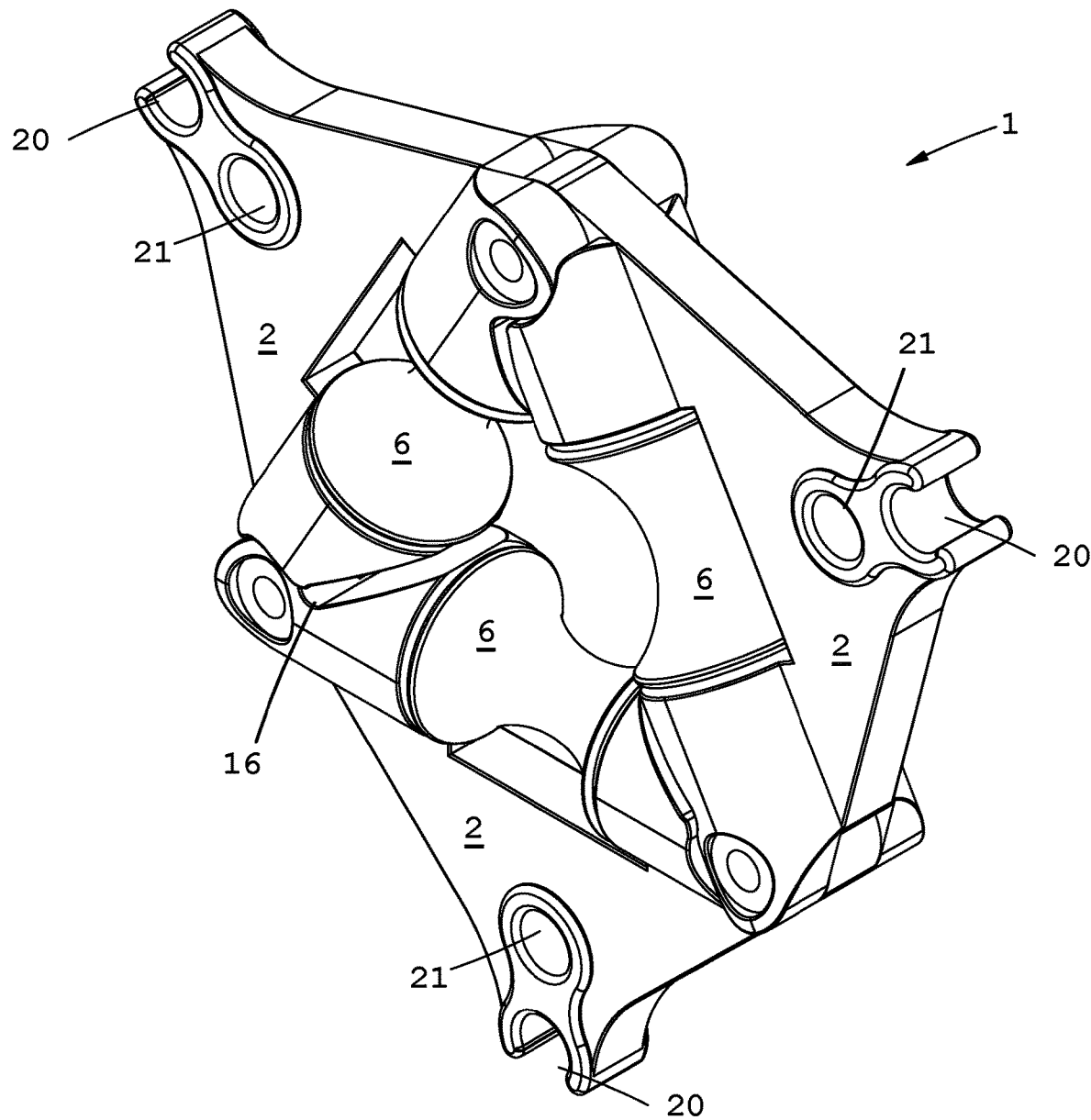
FIG. 9 is a perspective view of a second embodiment of an apparatus for attaching restraining means to a line in a closed position.
Figure 10:
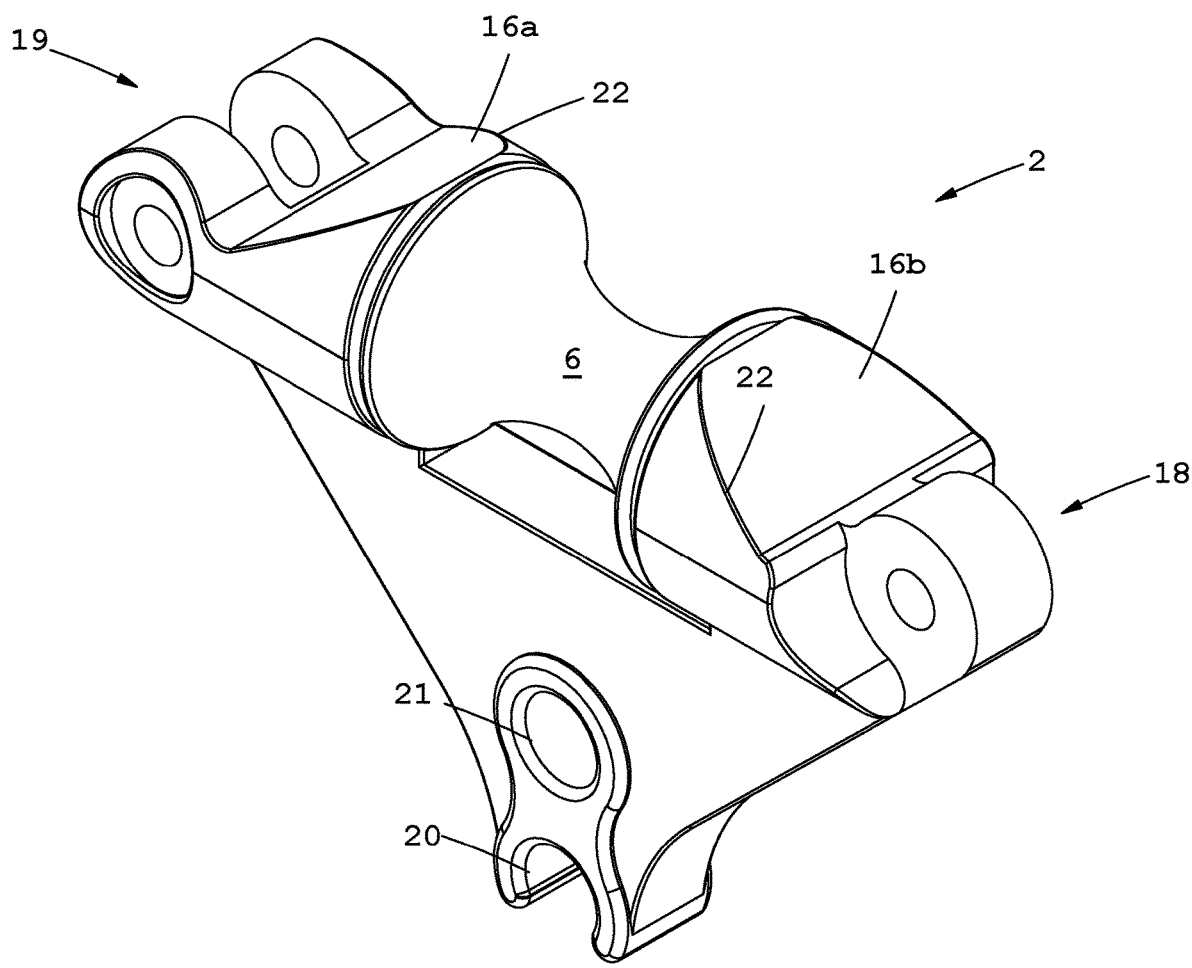
FIG. 10 is a perspective view of a second embodiment of a member.
Figure 11:
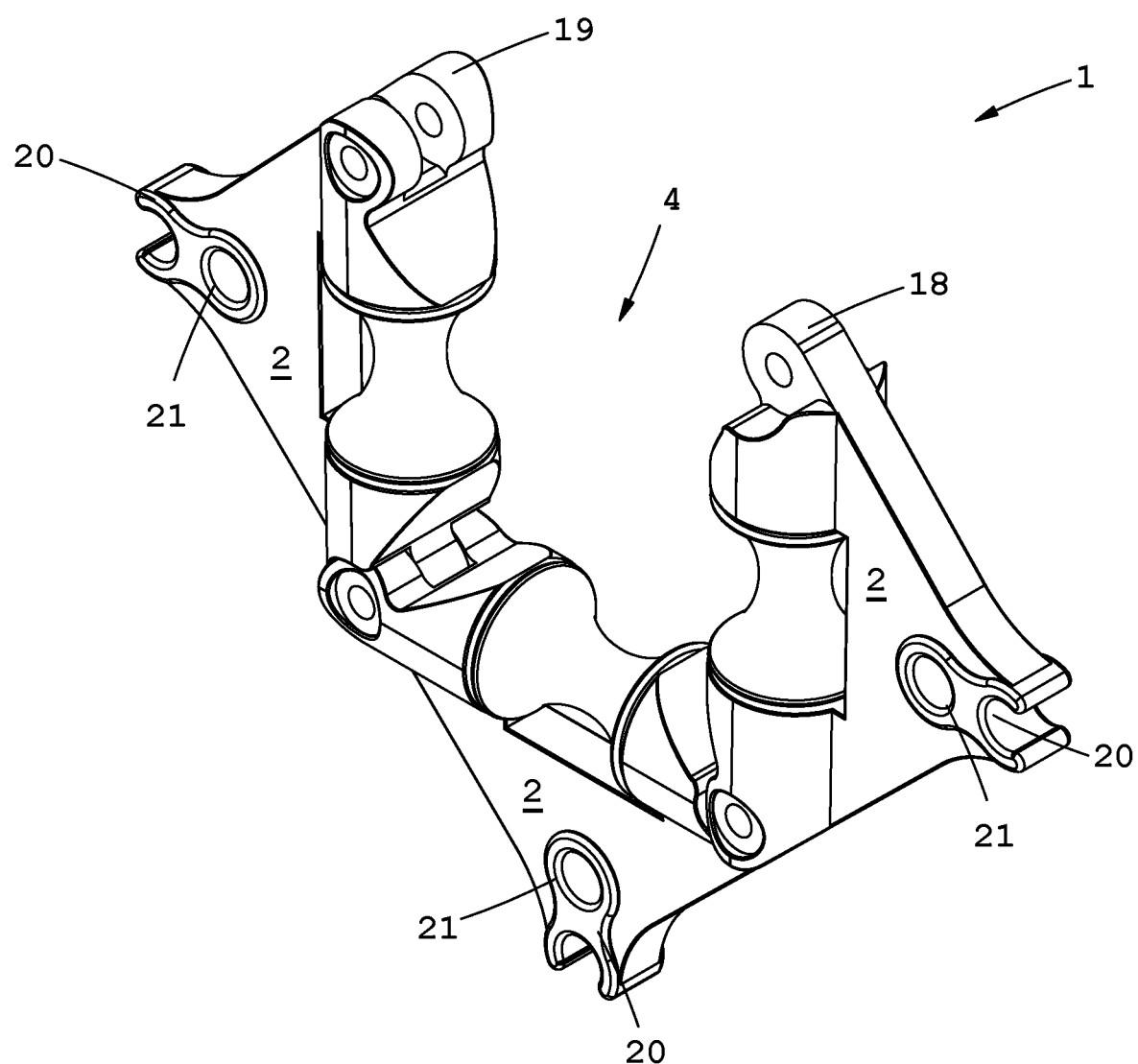
FIG. 11 is a perspective view of a second embodiment of an apparatus for attaching restraining means to a line in an open position.
Figure 12:
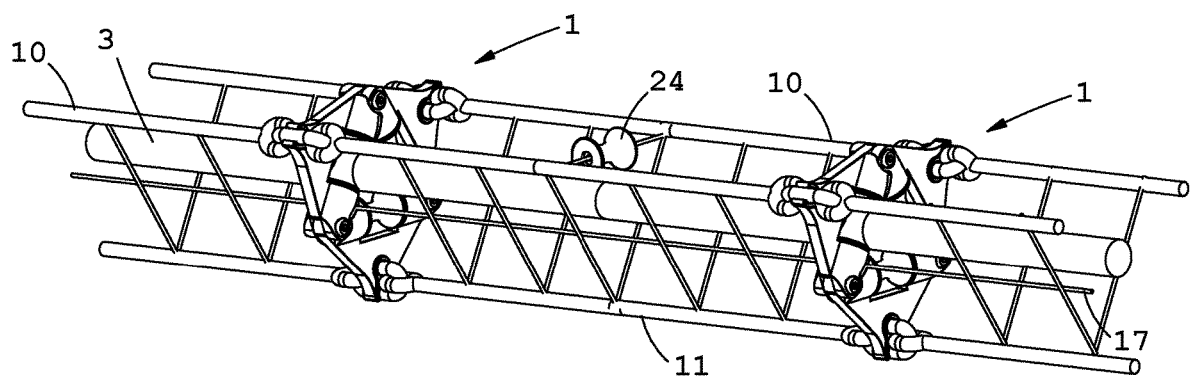
FIG. 12 is a perspective view of two second embodiments of an apparatus for attaching restraining means to a line in use.

Two embodiments of the apparatus 1 are shown in the drawings. A first embodiment of the apparatus 1 (and its related parts and features) is shown in FIGS. 1 to 8 and a second embodiment of the apparatus 1 (and its related parts and features) is shown in FIGS. 9 to 12.

The first embodiment of the apparatus 1 includes two opposing members 2 which are movable relative to each other. The members 2 may be manufactured from non-conductive material such as plastic. The members 2 are moveable such that the apparatus may be in an open position (shown in FIGS. 1, 3, 7, and 8) wherein a line 3 is engageable to the apparatus 1, in that the line may be inserted into the apparatus through opening 4 for engagement therein, and a closed position (shown in FIGS. 2 and 4) wherein a line 3 is engaged by the members 2.

In this example the members 2 are identical in shape and size. The members 2 oppose each other and move relative to each other by pivoting about a hinge 5 located at one end of the members 2 such that other ends of the members 2 pivot away from each other toward the open position and to each other towards the closed position.

Each member includes an engaging member in the form of a roller 6 which enables the apparatus 1 to move along a line 3 and a line 3 to move through the apparatus 1. Each roller 6 is mounted on the member 2 through axles 7 which allows the rollers 6 to rotate relative to the members 2. Each roller 6 has a concave profile such that the apparatus 1 forms an aperture 8 in the closed position between the two opposing rollers 6. The aperture 8 is substantially circular in plan view and the size thereof will generally be larger than the line 3 being engaged (this can be clearly seen in FIG. 8) but may be up to and including the shape and size of the line, depending on the force required to be exerted thereon.

At least one of the members 2 will have restraint attachment means for attaching a restraint 9 to the apparatus 1. Restraint 9, as used herein, refers to an elongate element, typically flexible and pliable, which may be used to restrain and catch a line in the event of failure thereof. Typically, the restraint 9 will be a net, but it will be appreciated by those in the art that the restraining characteristics of the net may easily be replicated by using any pliable mesh structure or even a textile or fabric trough. In the current example, the restraint is an elongate net 9 with two outer ropes 10 and central rope 11 running longitudinally along the net 9. A number of transverse ropes 12 extend between the central rope 11 and the outer ropes 10.

Each member 2 includes corner attachment means 13. The corner attachment means is in the form of a cylindrical formation which corresponds roughly to the size of the outer ropes 10 with an opening for inserting the outer rope therein which is smaller than the diameter of the outer ropes 10. This allows the outer ropes 10 to be inserted in the cylindrical formation by force and held therein. The corner engagement means may also include locking formations (not shown) which can close the opening after an outer rope 10 is inserted in the corner engagement means 13.

The apparatus 1 also includes a central attachment formation 14. The complete formation 14 is formed by the portions thereof 14a on each member 2. When the apparatus 1 is in the open position, the formation 14 is also open such that the central rope 11 may be inserted. In the closed position the central rope is engaged by the formations 14a and forms a closed cylindrical hole which encloses the central rope 11 therein. In plan view, the corner engaging means and central engaging formation form a triangular arrangement which allows the net 8 to be held in a concave shape below the line 3. The concave shape may be triangular as may be clearly seen in FIG. 8.

The members 2 include complementary locking means 15 for locking the apparatus 1 in the closed position. In the current example, the locking means is in the form of a cylindrical locking formation 15, wherein the locking formation 15*a* of one member, in the form of a recessed cylindrical formation, engages the locking formation 15*a* of the other member to form the complete locking formation 15. A bolt or lock may be inserted through the circular hole 15 which locks the apparatus 1 in the closed position.

The members 2 may form a groove 16 for positioning a recovery line 17 in the closed position. The groove 16 is formed by the complementary formations 16*a* on each member 2. The groove 16 is located operatively lower than the aperture 8 such that a line 3 engaged in the aperture will prevent the recovery line 17 from exiting the groove 16.

The second embodiment of the apparatus 1 includes three members 2 which are shaped and sized for use with the second embodiment. The second embodiment retains the benefits of the first embodiment by having symmetrical features which allows all three members 2 to be identical and interchangeable. In addition to the benefits provided by the first embodiment, the members 2 of the second embodiment are relatively smaller than the first embodiment and as there are three members, the rollers 6 each need only to cover a third of the circumference of the line 3. The rollers will typically be made of polytetrafluoroethylene (such as Teflon®) or another polymer with a suitably low coefficient of friction. This allows the rollers 6 to move smoothly about the line 3 even in the absence of the rollers rotating. However, these polymers are usually comparatively more expensive than the material of the members 2 and, as such, having three smaller rollers 6 allows the cost of the apparatus as a whole to be lowered.

The second embodiment has a further improvement over the first embodiment in that the hinge 5 and locking formations 15 of the first embodiment have been integrated as a single engaging formation 18 and complementary engaging formation 19. These formations are shaped to engage each other on adjacent members 2 which form the apparatus 1. In the example shown in the figures, the first formation 18 has a central protrusion with a hole therethrough and the second complementary formation 19 has two protrusions with holes therethrough such that, when engaged, the protrusions of the second complementary formation 19 are on both sides of the central protrusion of the first formation 18 and the holes of the three protrusions align. Along with a pin (not shown) which may be installed in the aligned holes, this arrangement allows a pivotable connection to be created between two adjacent and engaged members. The pin may also include a threaded portion which may engage a complementary threaded portion on at least one of the protrusions. Similarly, a regular pin with a locking mechanism such as a split pin, pin lock, key, or quick release may also be used. As the pin and formations (18 and 19) act as both a hinge and a locking formation, the second embodiment has the further advantage that the open position may be achieved by disengaging any of the three members and the apparatus 1 will be in the closed position when the last member 2 is connected to the remaining members. This also allows the apparatus 1 to be symmetrical and used in a number of different orientations.

The second embodiment of the apparatus 1 has restraint attachment means 20 which replaces, and is similar in shape size and function to, both the corner attachment means 13 and the central attachment means 14 of the first embodiment. The restraint attachment means 20 may be used as either corner attachment means 13 or central attachment means 14 depending on orientation of the apparatus 1. In addition, each member 2 includes a hole 21 which may form part of the attachment means 20. The hole allows various types of attachments to be made including, but not limited to, cable ties, shackles, and/or soft shackles.

The second embodiment forms a groove 16 for holding a recovery rope 17 between adjacent members 2. An improvement over the first embodiment is that the recovery rope can be wedged between the adjacent surfaces 16*a* and 16 of adjacent members 2 to hold the recovery rope 17 securely in place in the closed position for installation. At least one of these surfaces (16*a* or 16*b*) may include a ball detent (not shown) or similar mechanism, to ensure that the recovery rope 17 remains in a corner of the groove 16 and will require some force to dislodge. The surfaces (16*a* and 16*b*) are terminate in rounded edges 22. The rounded edges surrounding the groove 16 and faces (16*a* and 16*b*) provide the additional feature that when a thicker rope or line is attached to the recovery rope 17 (as discussed in further detail below), the thicker rope will engage and follow the rounded edges 22 and eventually exit the groove such that the thicker rope is positioned between the rollers 6. This also allows the necessary force to be applied to the ball detent.

In use, the invention extends to a method of attaching restraining means to a line. In the current example the method will be explained where apparatuses 1 are used to replace an existing ground wire with an optical ground wire (OPGW) between two support structures. This is a common example of where the invention will be utilised in industry as it is desirable to add the OPGWs to replace older ground wires. The ground wire is usually grounded (earthed) at the top of a supporting structure, to minimize the likelihood of direct lightning strikes to live phase conductors below.

The method includes the steps of providing elongate net 9 and a plurality of apparatuses 1 for attaching the net 9 to a line 3. An operator on the ground will attach the apparatuses 1 to the net 1 at regular intervals. For apparatuses of the first embodiment, each apparatus will be moved to the open position, with the formations 14*a* positioned about the central rope 11 and moved to the closed position to secure the central line in the central formation 14. For apparatuses of the second embodiment, the central rope 11 will be attached to the attachment means 20 of the operatively lower member 2. The operator will then attach the outer ropes 10 to the corner engaging means 13 and the ropes will be secured by locking the corner engaging means. This is done for each apparatus and the apparatuses will be spaced apart along the length of the net 9. At this stage, a recovery line may also be placed within the apparatus 1.

A second operator will be positioned atop the support structure where the existing ground wire is located. One end of the assembled net 9 and apparatuses 1 will be raised to the second operator where the operator moves the first apparatus 1 to the open position and positions the apparatus about the existing ground wire 3. The apparatus is moved to the closed position such that it engages the ground wire 3 and is locked in place by (for example) inserting a bolt through the locking formation 15. The end of the net 9 is now movable on the wire 3 by movement of the rollers thereon. At this stage another roller 24 which is removable attached to the net 9 by, for example, a rope and carabiner, may be attached to close the top of the net 9 in the event of line 3 backlash and to keep the line 3 within the net. The end of the net may now be drawn towards the second support structure by a tug or pilot rope. The second operator will attach the next apparatus 1 to the wire 3 in a similar fashion and continue sequentially until all apparatuses 1 are attached to the wire 3. At this stage, the net 9 will be positioned below and along the length of wire 3 between the support structures. A third operator, located atop the second tower, will attach and secure the first end of the net 9 to the second support structure and the second operator will attach the other end of the net 9 to the first support structure. The net is now positioned and secured below the entire length of the wire 3.

The wire 3 is cut close to the first tower and spliced to the replacement OPGW 3. the existing wire (and OPGW) 3 is then drawn from the second support structure and will move through the apertures 8 of the apparatuses from the one tower to the other. The most likely point of failure is the splice between the existing wire 3 and the replacement OPGW. If the splice fails when the lines are pulled through, the falling wires will be caught by the net 9 below them and prevent the wires from falling and contacting the live phase wires below. At this stage, the recovery rope 17 may be used as a fish to pull through the replacement OPGW to the second tower or pull through an intermediate stronger rope or cable to be used as a fish for the replacement OPGW.

When the OPGW reaches the second tower, the net may be released and the method as described above may be repeated between the second tower and a third tower.

It is envisaged that the invention will provide an apparatus for attaching a restraint to a line which is simple to use and easy to attach to a line with minimal effort from an operator. The apparatus is also unique in that it may be attached to the restraint whilst on the ground and lifted in an assembled form onto a support structure. In the case where the members of an apparatus are identical, the invention provides the further benefit of reducing manufacturing cost as only a single mould would be needed to manufacture the apparatus.

The invention is not limited to the precise details as described herein. For example, instead of having cylindrical, force-fit, attachment means, the attachment means may be in the form of a rope clamp or clasp to engage portions of the restraint. Further, the aperture need not be circular and may be oval or hexagonal. The examples herein are described in relation to powerlines, where the invention is employed between towers, but may also be applied between buildings, pylons, and/or poles.

The invention claimed is:

1. An apparatus for attaching restraining means to a line comprising:
   two or more members movable relative to each other between an open position wherein a line is engageable by the apparatus and a closed position wherein a line is engaged by the members;
   at least one of the members including restraint attachment means for attaching the restraining means to the apparatus; and
   wherein the restraining means includes an elongate net with two outer portions and a central portion running longitudinally along the net.

2. The apparatus for attaching restraining means to a line of claim 1 wherein the members move relative to each other by pivoting about a hinge located at one end of the members such that other ends of the members pivot away from each other toward the open position and to each other towards the closed position.

3. The apparatus for attaching restraining means to a line of claim 1 wherein the members include locking means for locking the apparatus in the closed position and the locking means includes a locking formation and the locking formation of one member engages the locking formation of the other member.

4. The apparatus for attaching restraining means to a line of claim 3 wherein the locking means includes a removable pin which locks the members together in the closed position and the pin is a pivot about which members can pivot in the open position.

5. The apparatus for attaching restraining means to a line of claim 1 wherein the members are identical in shape and size.

6. The apparatus for attaching restraining means to a line of claim 5 wherein the identical members engage each other inverted.

7. The apparatus for attaching restraining means to a line of claim 1 wherein each member includes an engaging formation on one end and a complementary engaging formation on an opposing end such that the engaging formation on one end of the member can engage a complementary engaging formation on another member.

8. The apparatus for attaching restraining means to a line of claim 1 wherein each member includes a roller for engaging a line and which enables the apparatus to move along the line.

9. The apparatus for attaching restraining means to a line of claim 1 wherein the members form a groove for positioning a recovery line in the closed position.

10. The apparatus for attaching restraining means to a line of claim 9 wherein the groove is located operatively lower than the aperture such that a line engaged in the aperture will prevent the recovery line from exiting the groove.

11. The apparatus for attaching restraining means to a line of claim 9 wherein the groove is formed between members and engage the recovery line between the members.

12. The apparatus for attaching restraining means to a line of claim 1 wherein at least one of the members have attachment means for attaching restraining means to the apparatus.

13. The apparatus for attaching restraining means to a line of claim 12 wherein the attachment means is located operatively at a corner of the apparatus.

14. The apparatus for attaching restraining means to a line of claim 12 wherein the attachment means includes locking means for securing at least part of the restraining means to the member.

15. The apparatus for attaching restraining means to a line of claim 12 wherein the attachment means of the members are arranged in a triangular formation when the apparatus is in the closed position.

\* \* \* \* \*